US008812321B2

(12) United States Patent
Gilbert et al.

(10) Patent No.: US 8,812,321 B2
(45) Date of Patent: Aug. 19, 2014

(54) SYSTEM AND METHOD FOR COMBINING SPEECH RECOGNITION OUTPUTS FROM A PLURALITY OF DOMAIN-SPECIFIC SPEECH RECOGNIZERS VIA MACHINE LEARNING

(75) Inventors: Mazin Gilbert, Warren, NJ (US); Srinivas Bangalore, Morristown, NJ (US); Patrick Haffner, Atlantic Highlands, NJ (US); Robert Bell, Berkeley Heights, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 427 days.

(21) Appl. No.: 12/895,359

(22) Filed: Sep. 30, 2010

(65) Prior Publication Data

US 2012/0084086 A1 Apr. 5, 2012

(51) Int. Cl.
*G10L 15/08* (2006.01)
*G10L 15/32* (2013.01)

(52) U.S. Cl.
CPC .................................. *G10L 15/32* (2013.01)
USPC ............................. 704/255; 704/236; 704/254

(58) Field of Classification Search
CPC ....... G10L 15/08; G10L 15/26; G10L 15/265; G10L 15/32
USPC ......... 704/231, 232, 236, 243, 244, 251, 252, 704/255, 235, 254
See application file for complete search history.

(56) References Cited

U.S. PATENT DOCUMENTS

| | | | | |
|---|---|---|---|---|
| 5,710,864 A * | 1/1998 | Juang et al. | .................... | 704/238 |
| 5,754,978 A * | 5/1998 | Perez-Mendez et al. | ..... | 704/255 |
| 6,061,646 A * | 5/2000 | Martino et al. | .................... | 704/3 |
| 6,324,510 B1 * | 11/2001 | Waibel et al. | ............... | 704/256.7 |
| 6,487,532 B1 * | 11/2002 | Schoofs et al. | ................ | 704/251 |
| 6,526,380 B1 * | 2/2003 | Thelen et al. | ................ | 704/251 |
| 6,671,669 B1 * | 12/2003 | Garudadri et al. | ............ | 704/255 |
| 6,973,429 B2 * | 12/2005 | Smith | ............................ | 704/257 |
| 7,016,835 B2 * | 3/2006 | Eide et al. | ...................... | 704/231 |
| 7,286,989 B1 * | 10/2007 | Niedermair et al. | .......... | 704/275 |
| 7,739,286 B2 * | 6/2010 | Sethy et al. | ..................... | 707/737 |
| 7,899,669 B2 * | 3/2011 | Gadbois | ....................... | 704/235 |
| 8,041,565 B1 * | 10/2011 | Bhardwaj et al. | ............. | 704/235 |
| 8,301,450 B2 * | 10/2012 | Lee et al. | ....................... | 704/257 |
| 2002/0194000 A1 * | 12/2002 | Bennett et al. | ................ | 704/270 |
| 2003/0050777 A1 * | 3/2003 | Walker, Jr. | ..................... | 704/235 |
| 2003/0115053 A1 * | 6/2003 | Eide et al. | ...................... | 704/231 |
| 2004/0138885 A1 * | 7/2004 | Lin | ................................ | 704/240 |
| 2004/0153319 A1 * | 8/2004 | Yacoub | ........................ | 704/240 |
| 2004/0210437 A1 * | 10/2004 | Baker | .......................... | 704/251 |
| 2005/0065789 A1 * | 3/2005 | Yacoub et al. | ................ | 704/231 |
| 2005/0177371 A1 * | 8/2005 | Yacoub et al. | ............. | 704/270.1 |
| 2006/0064177 A1 * | 3/2006 | Tian et al. | .......................... | 700/1 |
| 2009/0018833 A1 * | 1/2009 | Kozat et al. | .................... | 704/257 |
| 2009/0112586 A1 * | 4/2009 | Williams | ...................... | 704/239 |
| 2009/0138265 A1 * | 5/2009 | Willett et al. | .................. | 704/251 |
| 2009/0271195 A1 * | 10/2009 | Kitade et al. | .................. | 704/239 |
| 2010/0004930 A1 * | 1/2010 | Strope et al. | ................... | 704/240 |

(Continued)

*Primary Examiner* — Martin Lerner

(57) ABSTRACT

Disclosed herein are systems, methods and non-transitory computer-readable media for performing speech recognition across different applications or environments without model customization or prior knowledge of the domain of the received speech. The disclosure includes recognizing received speech with a collection of domain-specific speech recognizers, determining a speech recognition confidence for each of the speech recognition outputs, selecting speech recognition candidates based on a respective speech recognition confidence for each speech recognition output, and combining selected speech recognition candidates to generate text based on the combination.

19 Claims, 4 Drawing Sheets

(56) References Cited

U.S. PATENT DOCUMENTS

| | | | |
|---|---|---|---|
| 2010/0191530 A1* | 7/2010 | Nakano et al. | 704/244 |
| 2010/0318358 A1* | 12/2010 | Onishi et al. | 704/255 |
| 2011/0010177 A1* | 1/2011 | Nakano et al. | 704/257 |
| 2011/0047139 A1* | 2/2011 | Strope et al. | 707/706 |

* cited by examiner

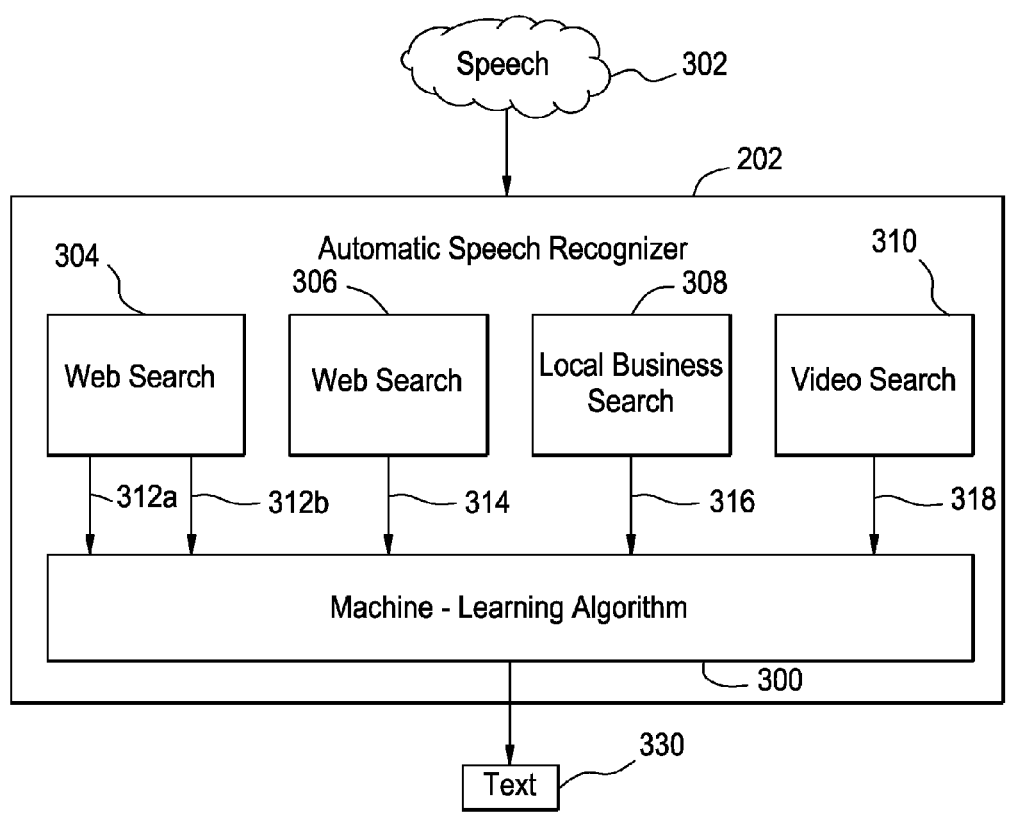

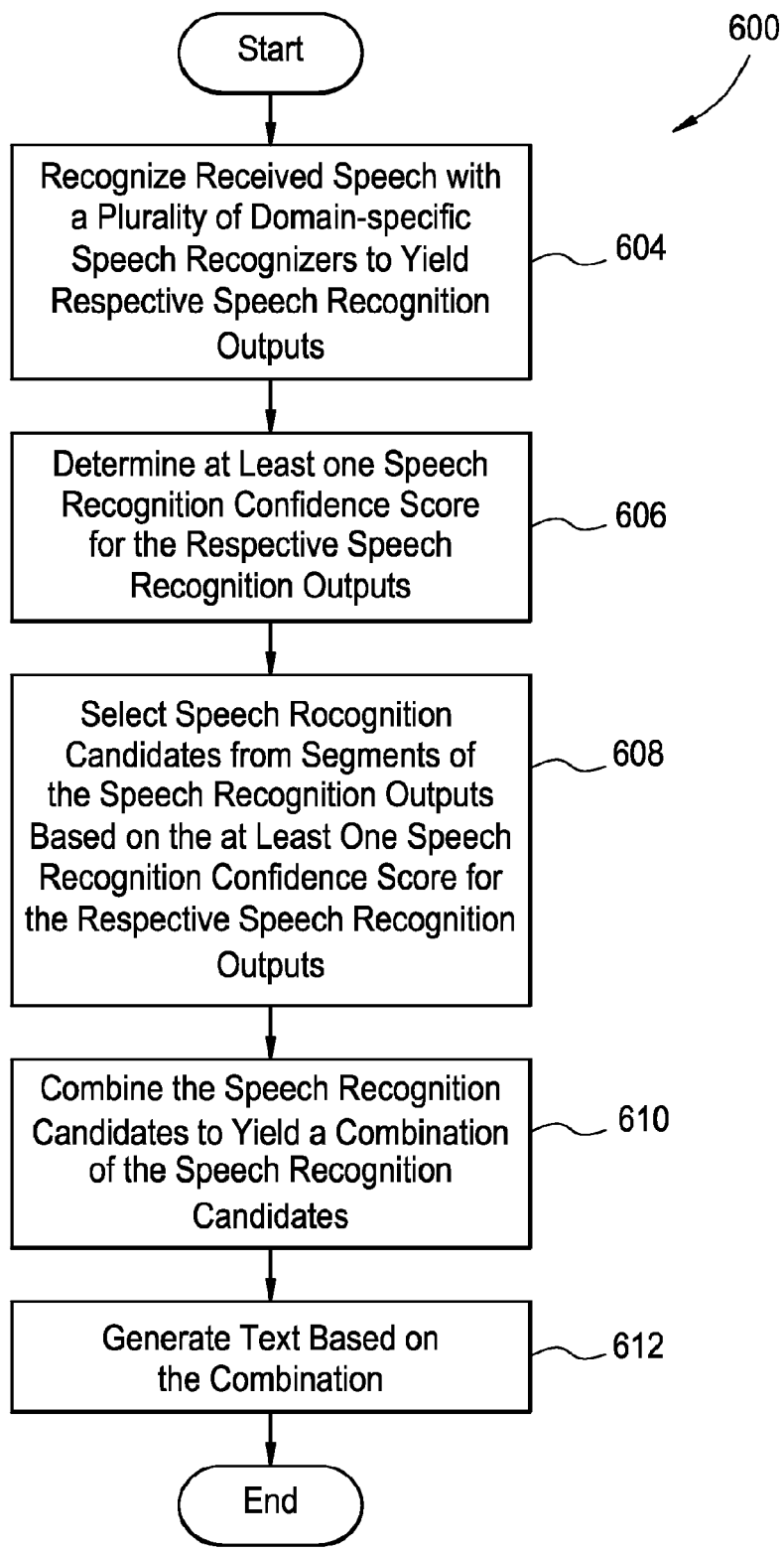

SYSTEM AND METHOD FOR COMBINING SPEECH RECOGNITION OUTPUTS FROM A PLURALITY OF DOMAIN-SPECIFIC SPEECH RECOGNIZERS VIA MACHINE LEARNING

BACKGROUND

1. Technical Field

The present disclosure relates to automatic speech recognition and, in particular, to automatic speech recognition across different applications or environments.

2. Introduction

Over the past 5 decades, researchers and developers have been creating tools and algorithms to enable rapid development of acoustic and language models to support domain-specific speech recognition applications. These applications rely on speech recognition models. Often, a generic speech model is used to recognize speech from multiple users. Similarly, current systems capable of performing speech recognition across different applications or environments rely on generic speech models. Given that speech recognizers depend significantly on the distribution of words and phrases, such systems typically fail as they attempt to provide generality while lowering performance.

Moreover, these systems require tremendous costs to develop. For example, a team of 3-6 people may take 3-6 months to develop a single speech application. In addition, known models for performing speech recognition across different applications or environments perforce require a high volume of data. Disadvantageously, these systems are created by combining all potential data available into a single system. The increased volume of data requires intensive processing and causes out of memory problems. As a result, these systems are costly and hard to scale.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and non-transitory computer-readable storage media for performing speech recognition across different applications or environments without model customization or prior knowledge of the domain of the received speech. In accordance with the disclosure, speech recognition across multiple applications or environments is improved by using a collection of domain-specific speech recognizers to recognize received speech to yield respective speech recognition outputs; determining at least one speech recognition confidence score for the respective speech recognition outputs; selecting, via a machine-learning algorithm, speech recognition candidates from segments of the speech recognition outputs based on the at least one speech recognition confidence score for the respective speech recognition outputs; and combining, via a machine-learning algorithm, selected speech recognition candidates to generate text.

In this way, speech recognition across multiple applications or environments can be accomplished without model customization and necessitates a lower volume of data, thereby increasing scalability and reducing cost. This approach provides numerous additional benefits, such as higher speech recognition performance and rapid deployment of speech applications without intensive development of expertise.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 is a schematic block diagram illustrating one embodiment of an example system for automatic speech recognition; and FIG. 4 is a schematic flow chart diagram illustrating one embodiment of an example method for automatic speech recognition.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for developing a system capable of performing speech recognition across different applications or environments without model customization or prior knowledge of the domain of the received speech. Some introductory principles and concepts are discussed first, followed by a brief introductory description of a basic general purpose system or computing device in FIG. 1 which can be employed to practice the concepts disclosed herein. A more detailed description of an exemplary natural language spoken dialog system in FIG. 2, an exemplary automatic speech recognition system in FIG. 3, and an exemplary method in FIG. 4 will then follow.

This disclosure provides a system for performing speech recognition across different applications or environments without model customization or prior knowledge of the domain of the received speech. Known models for performing speech recognition across different applications or environments require a high volume of data. Disadvantageously, these systems are created by combining all potential data available into a single system. The increased volume of data requires intensive processing and causes out of memory problems. As a result, these systems are costly and hard to scale.

The approaches discussed herein can be used to provide a standards-based API (like a web services API) where developers provide audio input and obtain text output without any model building, tuning, or optimization. The system determines the best recognition performance by aggregating information from a collection of domain-specific speech recognizers. Accordingly, the system provides speech recognition across multiple applications or environments without model customization and a lower volume of data, thereby increasing scalability and reducing cost. These principles provide numerous additional benefits, such as higher speech recognition performance and rapid deployment of speech applications without intensive development of expertise.

Figure 1:
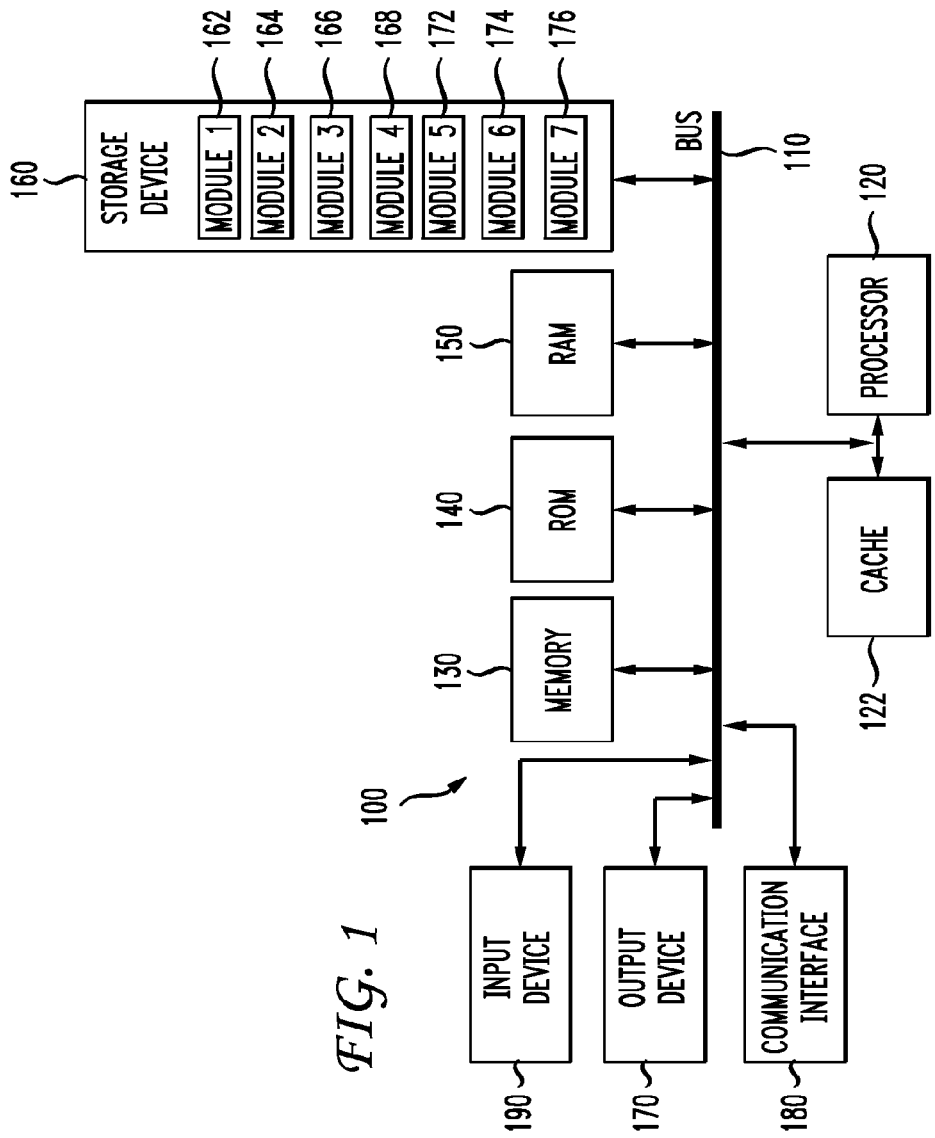
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, module 3 166, module 4 168, module 5 172, module 6 174, and module 7 176 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166, 168, 172, 174, 176 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media, computer-readable storage devices, or computer-readable memory devices, expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates seven modules Module 1 162, Module 2 164, Module 3 166, Module 4 168, Module 5 172, Module 6 174, and Module 7 176 which are modules configured to control the processor 120. These modules may be stored on the storage device 160 and loaded into RAM 150 or memory 130 at runtime or may be stored as would be known in the art in other computer-readable memory locations.

Figure 2:
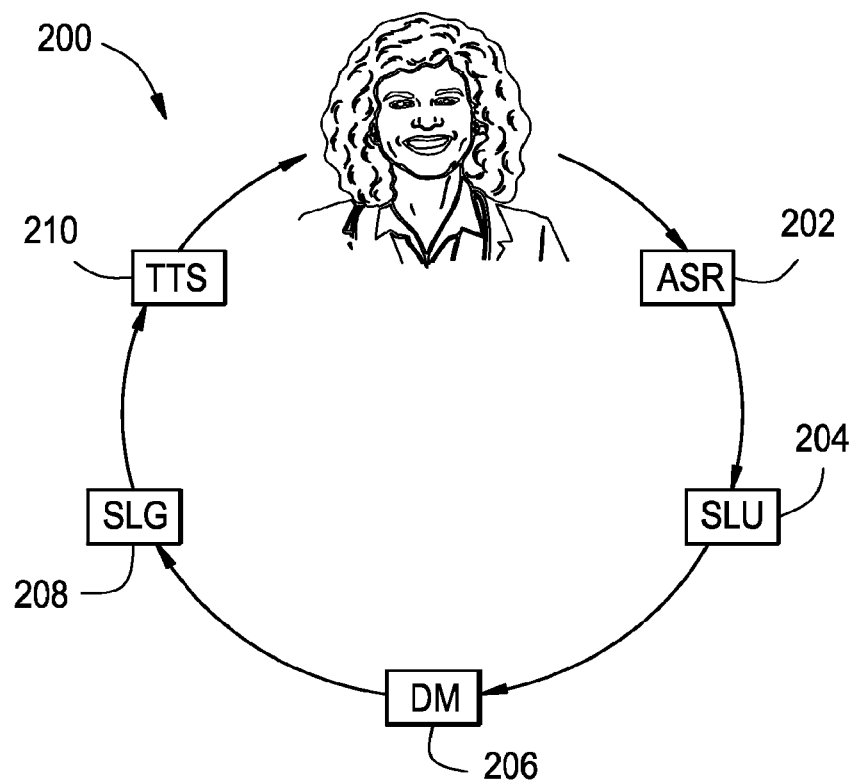
FIG. 2 is a functional block diagram that illustrates an exemplary natural language spoken dialog system.

Having disclosed some basic system components, the disclosure now turns to the exemplary natural language spoken dialog system shown in FIG. 2. For the sake of clarity, FIG. 2 is discussed in terms of an exemplary system such as is shown in FIG. 1 configured to recognize speech input, transcribe the speech input, identify the meaning of the transcribed speech, determine an appropriate response to the speech input, generate text of the appropriate response, and generate audible "speech" based on the generated text.

FIG. 2 is a functional block diagram that illustrates an exemplary natural language spoken dialog system. Spoken dialog systems aim to identify intents of humans, expressed in natural language, and take actions accordingly, to satisfy their requests. Natural language spoken dialog system 200 can include an automatic speech recognition (ASR) module 202, a spoken language understanding (SLU) module 204, a dialog management (DM) module 206, a spoken language generation (SLG) module 208, and text-to-speech module (TTS) 210. The text-to-speech module can be any type of speech output module. For example, it can be a module wherein text is selected and played to a user. Thus, the text-to-speech module represents any type of speech output. The present disclosure focuses on innovations related to the ASR module 202 and can also relate to other components of the dialog system.

The ASR module 202 analyzes speech input and provides a textual transcription of the speech input as output. SLU module 204 can receive the transcribed input and can use a natural language understanding model to analyze the group of words that are included in the transcribed input to derive a meaning from the input. The role of the DM module 206 is to interact in a natural way and help the user to achieve the task that the system is designed to support. The DM module 206 receives the meaning of the speech input from the SLU module 204 and determines an action, such as, for example, providing a response, based on the input. The SLG module 208 generates a transcription of one or more words in response to the action provided by the DM 206. The text-to-speech module 210 receives the transcription as input and provides generated audible speech as output based on the transcribed speech.

Thus, the modules of system 200 recognize speech input, such as speech utterances, transcribe the speech input, identify (or understand) the meaning of the transcribed speech, determine an appropriate response to the speech input, generate text of the appropriate response and from that text, generate audible "speech" from system 200, which the user then hears. In this manner, the user can carry on a natural language dialog with system 200. Those of ordinary skill in the art will understand the programming languages for generating and training ASR module 202 or any of the other modules in the spoken dialog system. Further, the modules of system 200 can operate independent of a full dialog system. For example, a computing device such as a smartphone (or any processing device having a phone capability) can include an ASR module wherein a user says "call mom" and the smartphone acts on the instruction without a "spoken dialog." A module for automatically transcribing user speech can join the system at any point or at multiple points in the cycle or can be integrated with any of the modules shown in FIG. 2.

The disclosure now turns to FIG. 3, which illustrates one embodiment of a system 202 for automatic speech recognition. The system 202 includes the natural language spoken dialog system 202 of FIG. 2, however, for clarity, only the ASR 202 is depicted here.

The system 202 first receives speech 302. The system 202 then recognizes the received speech with a collection of domain-specific speech recognizers 304, 306, 308, and 310, to yield respective speech recognition outputs 312a, 312b, 314, 316, and 318. The collection of domain-specific speech recognizers 304, 306, 308, and 310 includes at least two experts from different domains; at least one of the different domains includes SMS, question/answering, video search, broadcast news, voicemail to text, web search, or local business search. For the purposes of this disclosure, an expert is defined as a domain-specific speech recognizer. Moreover, in one embodiment, as seen from FIG. 3, the collection of domain-specific speech recognizers 304, 306, 308, and 310 can include one or more experts from a specific domain (e.g., web search 304, web search 306), and at least one expert from a different domain (e.g., local business search 308 and video search 310). Other exemplary different domains include travel, banking, and business.

Next, each expert from the collection of domain-specific speech recognizers 304, 306, 308, and 310 provides a speech recognition output 312a, 312b, 314, 316, and 318 based on the received speech 302. The following examples illustrate possible speech recognition outputs based on the words "Paris Hilton" as recognized by each expert: "Pairs Hill" 312a, "Paris Hilton" 314, "Paris Hill" 316, and "Perez Hilton" 318. An output can include a lattice, confidence scores, and other meta data including beam width. Accordingly, each output in our example above may include a confidence score, viz.: "Pairs Hill" may include a confidence score of 40, "Paris Hilton" may include a confidence score of 100, "Paris Hill" may include a confidence score of 74, and "Perez Hilton" may include a confidence score of 80. In one aspect, an output may include more than one confidence score; each confidence score corresponds to a different segment of the output. The following examples illustrate an output including a plurality of confidence scores: "Pairs Hill" and a confidence score of 40 for "Pairs" and 60 for "Hill," "Paris Hilton" and a confidence score of 100 for "Paris" and 100 for "Hilton," "Paris Hill" and a confidence score of 100 for "Paris" and 60 for "Hill," and "Perez Hilton" and a confidence score of 80 for "Perez" and 100 for "Hilton."

Next, the machine-learning algorithm 300 analyzes the speech recognition outputs 312a, 312b, 314, 316, and 318 to determine at least one speech recognition confidence score for the respective speech recognition outputs 312a, 312b, 314, 316, and 318. The machine-learning algorithm 300 then selects speech recognition candidates from segments of the speech recognition outputs 312a, 312b, 314, 316, and 318 based on at least one speech recognition confidence score for the respective speech recognition outputs 312a, 312b, 314, 316, and 318. For example, the machine-learning algorithm 300 may select the speech recognition candidates from those segments of the speech recognition outputs in our example having the highest confidence scores (100, 74, 100 respectively): "Paris Hilton," "Paris Hill," and "Hilton."

The machine-learning algorithm 300 then combines the speech recognition candidates to yield a combination of the speech recognition candidates, and generates a text string 330 based on the combination. For example, the machine-learning algorithm 300 can generate the words "Paris Hilton" based on the combination of "Paris Hilton," "Paris Hill," and "Perez Hilton." Alternatively, the machine-learning algorithm 300 can generate a text string 330 based on a single speech recognition candidate having the highest confidence score, which, in our example, corresponds to "Paris Hilton" 314.

In particular embodiments, the text string 330 includes a mesh of the speech recognition candidates. In another aspect, the experts divide the speech recognition candidates into substrings (e.g., "Paris" 312a, "Hilton" 312b), and the machine-learning algorithm 300 selects a best speech recognition candidate for each substring.

Finally, the system 202 collects usage statistics based on the speech recognition candidates. In one aspect, the system 202 uses the collected statistics to train the machine-learning algorithm 300. In another aspect, the system 202 uses the collected statistics to train the collection of domain-specific speech recognizers 304, 306, 308, and 310. The system 202 may also use the collected statistics to train both the machine-learning algorithm 300 and the collection of domain-specific speech recognizers 304, 306, 308, and 310. Training parameters can include a lattice combination and a neural network graph that learns from an edit distance between the speech recognition candidates and a correct recognition candidate. This step ensures that the machine-learning algorithm 300 and each expert from the collection of domain-specific speech recognizers 304, 306, 308, and 310 are optimized to increase overall performance.

The schematic flow chart diagrams included herein are generally set forth as logical flow chart diagrams. As such, the depicted order and labeled steps are indicative of one embodiment of the presented method. Other steps and methods can be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types can be employed in the flow chart diagram, they are understood not to limit the scope of the corresponding method. Indeed, some arrows or other connectors can be used to indicate only the logical flow of the method. For instance, an arrow can indicate a waiting or monitoring period of unspecified duration between enumerated steps of the depicted method. Additionally, the order in which a particular method occurs can or cannot strictly adhere to the order of the corresponding steps shown. One or more steps of the following methods are performed by a hardware component such as a processor or computing device.

FIG. 4 is a schematic flow chart diagram illustrating a disclosed method 600 for automatic speech recognition. As seen from FIG. 4, the method 600 starts and the collection of domain-specific speech recognizers 304, 306, 308, and 310 of FIG. 3 first recognize the received speech 302 of FIG. 3 to yield respective speech recognition outputs 604. The machine-learning algorithm 300 of FIG. 3 then analyzes the speech recognition outputs 312a, 312b, 314, 316, and 318 of FIG. 3 to determine at least one speech recognition confidence score for the respective speech recognition outputs 312a, 312b, 314, 316, and 318 of FIG. 3 606.

Next, the machine-learning algorithm 300 of FIG. 3 selects speech recognition candidates from segments of the speech recognition outputs 312a, 312b, 314, 316, and 318 of FIG. 3, based on the at least one speech recognition confidence score for the respective speech recognition outputs 608. The machine-learning algorithm 300 of FIG. 3 then combines the speech recognition candidates to yield a combination of the speech recognition candidates 610, and generates a text string 330 of FIG. 3 based on the combination 612. Alternatively, the machine-learning algorithm 300 of FIG. 3 can generate a text string 330 of FIG. 3 based on a single speech recognition candidate having a highest confidence score. In particular embodiments, the text string 330 of FIG. 3 includes a mesh of the speech recognition candidates. In another aspect, the experts divide the speech recognition candidates into substrings, and the machine-learning algorithm 300 of FIG. 3 selects a best speech recognition candidate for each substring.

This approach allows for speech recognition across multiple applications or environments without model customization or knowledge of the domain of the received speech. This approach requires a lower volume of data, thereby increasing scalability and reducing cost, and provides numerous additional benefits, such as higher speech recognition performance and rapid deployment of speech applications without intensive development of expertise.

Embodiments within the scope of the present disclosure may also include tangible computer-readable storage media for carrying or having computer-executable instructions or data structures stored thereon for controlling a data processing device or other computing device. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
recognizing, via a processor, received speech with a plurality of domain-specific speech recognizers without knowledge of a domain of the received speech, the plurality of domain-specific speech recognizers comprising two domain-specific speech recognizers from different domains and two domain-specific speech recognizers from a specific domain, wherein each domain-specific speech recognizer of the plurality of domain-specific speech recognizers recognizes the received speech, to yield respective speech recognition outputs;
determining a speech recognition confidence score for each of the respective speech recognition outputs;
selecting speech recognition candidates from segments of the respective speech recognition outputs based on the speech recognition confidence score for the respective speech recognition outputs;
combining, via a machine-learning algorithm, the speech recognition candidates, to yield a combination of the speech recognition candidates; and
generating text based on the combination.

2. The method of claim 1, wherein the speech recognition candidates are selected without knowledge of the domain of the received speech.

3. The method of claim 1, wherein one of the different domains comprises one of travel, banking, and business.

4. The method of claim 1, wherein the machine-learning algorithm comprises a mixture of domain-specific speech recognizers from different domains, wherein the mixture of domain-specific speech recognizers comprises two of the following: local business search, web search, Short Messaging Service, question/answering, video search, broadcast news, and voicemail to text.

5. The method of claim 4, wherein selecting the speech recognition candidates further comprises comparing domain-specific speech recognizers in the mixture of domain-specific speech recognizers to select the best speech recognition candidates.

6. The method of claim 1, wherein selecting the speech recognition candidates further comprises selecting a speech recognition candidate having a highest confidence score.

7. The method of claim 1, wherein selecting the speech recognition candidates further comprises:
dividing the received speech into substrings; and
selecting a best speech recognition candidate for each substring.

8. The method of claim 1, further comprising mixing the speech recognition candidates.

9. The method of claim 1, further comprising creating a lattice of the speech recognition candidates.

10. The method of claim 9, further comprising:
collecting statistics based on the speech recognition candidates; and
training the machine-learning algorithm based on the statistics.

11. The method of claim 10, wherein training parameters are based on one of a lattice combination and a neural network graph that learns from an edit distance between the speech recognition candidates and a correct recognition candidate.

12. The method of claim 1, wherein a speech recognition candidate comprises one of a lattice, confidence scores, and speech recognition metadata.

13. The method of claim 1, further comprising:
collecting statistics based on the speech recognition candidates; and
training parameters associated with the domain-specific speech recognizers based on the statistics.

14. A system comprising:
a processor; and
a computer-readable storage medium having instructions stored which, when executed by the processor, result in the processor performing operations comprising:
recognizing, via a processor, received speech with a plurality of domain-specific speech recognizers without knowledge of a domain of the received speech, the plurality of domain-specific speech recognizers comprising two domain-specific speech recognizers from different domains and two domain-specific speech recognizers from a specific domain, wherein each domain-specific speech recognizer of the plurality of domain-specific speech recognizers recognizes the received speech, to yield respective speech recognition outputs;
determining a speech recognition confidence score for each of the respective speech recognition outputs;
selecting speech recognition candidates from segments of the respective speech recognition outputs based on the speech recognition confidence score for the respective speech recognition outputs;
combining, via a machine-learning algorithm, the speech recognition candidates, to yield a combination of the speech recognition candidates;
generating text based on the combination;
collecting usage statistics based on the speech recognition candidates;
training parameters associated with the plurality of domain-specific speech recognizers based on the usage statistics, to yield training parameters; and
training the machine-learning algorithm based on the usage statistics and the training parameters.

15. The system of claim 14, wherein the speech recognition candidates are selected without knowledge of the domain of the received speech.

16. The system of claim 14, wherein the training parameters for the machine-learning algorithm are based on one of a lattice combination and a neural network graph that learns from an edit distance between the speech recognition candidates and a correct recognition candidate.

17. A computer-readable storage device having instructions stored which, when executed by a computing device, cause the computing device to perform operations comprising:
recognizing, via a processor, received speech with a plurality of domain-specific speech recognizers without knowledge of a domain of the received speech, the plurality of domain-specific speech recognizers comprising two domain-specific speech recognizers from different domains and two domain-specific speech recognizers from a specific domain, wherein each domain-specific speech recognizer of the plurality of domain-specific speech recognizers recognizes the received speech, to yield respective speech recognition outputs;
determining a speech recognition confidence score for each of the respective speech recognition outputs;

selecting speech recognition candidates from segments of the respective speech recognition outputs based on the speech recognition confidence score for the respective speech recognition outputs;

combining, via a machine-learning algorithm, the speech recognition candidates, to yield a combination of the speech recognition candidates; and generating text based on the combination.

18. The computer-readable storage device of claim 17, wherein the speech recognition candidates are selected without knowledge of the domain of the received speech.

19. The computer-readable storage device of claim 17, wherein training parameters for the machine-learning algorithm are based on one of a lattice combination and a neural network graph that learns from an edit distance between the speech recognition candidates and a correct recognition candidate.

* * * * *